(No Model.)

J. WOOLFORD.
PROCESS OF EXTRACTING PRECIOUS METALS FROM REBELLIOUS ORES.

No. 598,721.       Patented Feb. 8, 1898.

Witnesses

Inventor
James Woolford
by Bakewell & Bakewell
his attys.

UNITED STATES PATENT OFFICE.

JAMES WOOLFORD, OF LONDON, ENGLAND.

PROCESS OF EXTRACTING PRECIOUS METALS FROM REBELLIOUS ORES.

SPECIFICATION forming part of Letters Patent No. 598,721, dated February 8, 1898.

Application filed August 21, 1896. Serial No. 603,489. (No specimens.)

*To all whom it may concern:*

Be it known that I, JAMES WOOLFORD, metallurgist, a citizen of England, residing at 659 Commercial Road East, in the city of London, England, have invented a new and useful Process of Extracting Precious Metals from Refractory Ores by Means of Antimony and for Recovery of the Antimony Employed, of which the following is a specification.

My invention relates to the extraction of precious metals from refractory ores by treating with antimony oxids and to the recovery of the antimony employed in this treatment.

The ore, whether in its natural state or in the state of clinkers after roasting or other treatment, is crushed and thoroughly mixed with an equal weight of antimony trioxid, with half its weight of the residue from reduction of antimony oxid, and with half its weight of finely-pulverized coal or charcoal. The mixture being fused in a cupola or other suitable furnace, the antimony oxid is reduced and the antimony forms an alloy with the precious metal. This alloy is tapped off and treated in an oxidizing-furnace, the bed of which is glazed with a mixture of borax and sulfate of soda. In this furnace the antimony becomes oxidized, the oxid passing away as fumes, while the precious metal remains on the bed of the furnace. Successive batches of the alloy may be treated until there is accumulation of the precious metal sufficient for being run off. The combustion-gases, with the fumes of antimony oxid, are drawn by a fan through cooling-passages and depositing-chambers, in which a large proportion of the oxid is deposited. In order to recover the last portions of the oxid and clear the gases from it, I employ in conjunction with the fan, which creates the draft through the cooling-passages and depositing-chambers, a nozzle furnishing a water-spray which mingles with the gases and fumes and is effectually mixed up with them by the blades of the fan. The water, with the oxid suspended in it, is drawn away from the lower part of the fan, while the gases pass away to a chimney or elsewhere almost entirely free from fumes.

Figure 1:
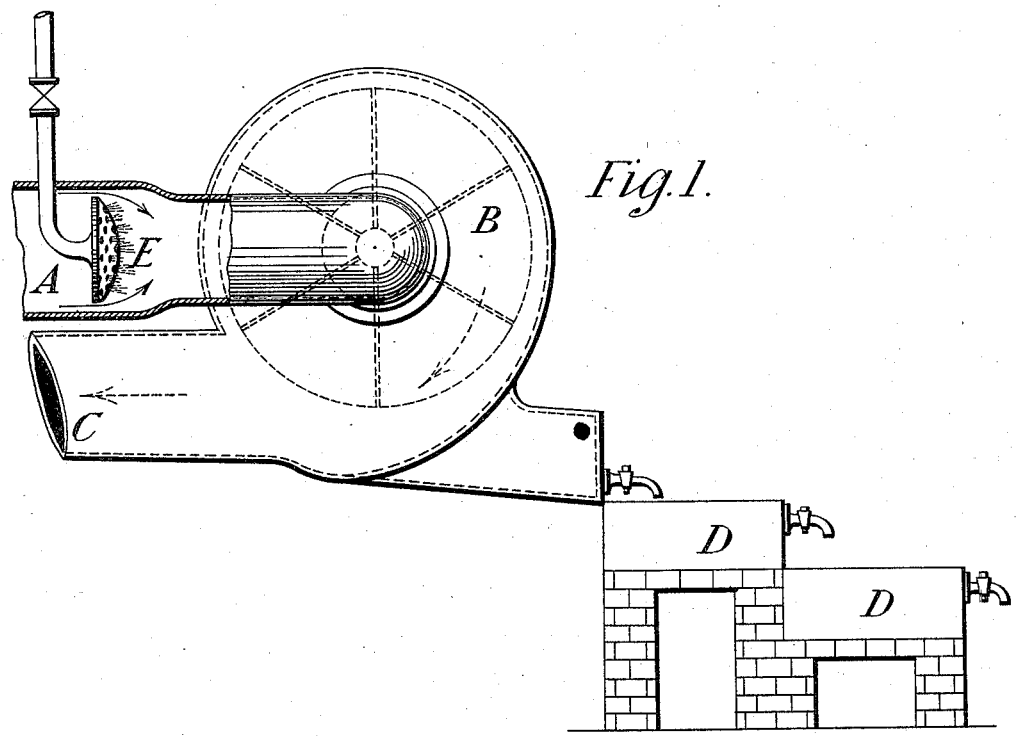
Figure 2:
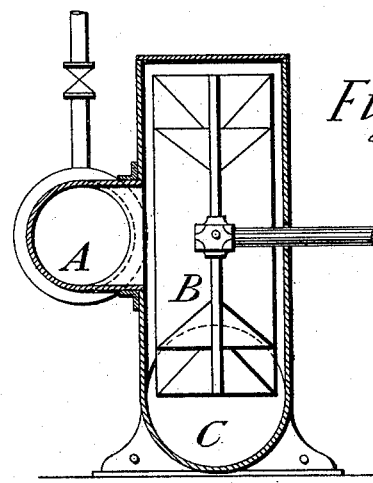

Figure 1 of the accompanying drawings is an elevation, partly in section; and Fig. 2 is a transverse section of the fan and water-nozzle.

A is the conduit leading the fumes from the depositing-chambers and cooling-passages to the suction-fan B. In the passage A is arranged a distributing-nozzle E, by which water is sent in spray to mingle with the fumes as they enter the fan, the blades of which break up the water and dash it about along with the fumes, causing separation of the particles suspended in them. While the gases thus cleared of the suspended particles pass away by the conduit C to a chimney or other discharge, the water mixed with the solid particles collects in the lower part of the fan and flows out to depositing-tanks D, in which the solid material is collected. Instead of sending water alone by the nozzle E water mingled with steam may be sent into the conduit, the steam being used as an injector-jet to cause the water to leave the nozzle with great speed and in a greatly-subdivided condition.

The oxid collected in the cooling-passages and deposit-chambers, as well as that removed from the depositing-tanks D and dried, may be used to treat fresh batches of ore, or may be reduced in any known way so as to obtain metallic antimony.

Having thus described the nature of my invention and the best means I know for carrying the same into practical effect, I claim—

1. The process of extracting precious metals from their ores, consisting in fusing a mixture of the ore and oxid of antimony and reducing the oxid of antimony, thus forming an alloy of antimony and the precious metal and then separating the precious metal from the antimony; substantially as described.

2. The herein-described process for extracting precious metals from refractory ores by fusing the crushed ore intimately mixed with antimony oxids and pulverized fuel, thus producing an alloy of antimony with the precious metals, treating the alloy in a suitable furnace thereby oxidizing the antimony and driving the oxid off as fumes leaving the precious metals on the furnace-bed.

3. The herein-described method of treating an alloy of antimony and precious metals, consisting in oxidizing the antimony in a furnace, passing the combustion-gases and antimony fumes through cooling-passages, and agitating them with water in said passages, whence the gases pass away, while the oxid is deposited in the water; substantially as described.

In testimony whereof I have signed my name to this specification, in the presence of two subscribing witnesses, this 29th day of July, A. D. 1896.

JAMES WOOLFORD.

Witnesses:
OLIVER IMRAY,
JNO. P. M. MILLARD.